(12) United States Patent
Koyanagi et al.

(10) Patent No.: US 10,166,525 B2
(45) Date of Patent: Jan. 1, 2019

(54) MICROWAVE IRRADIATING AND HEATING DEVICE

(71) Applicant: Mitsubishi Electric Corporation, Chiyoda-ku (JP)

(72) Inventors: Tomoyuki Koyanagi, Chiyoda-ku (JP); Michio Takikawa, Chiyoda-ku (JP); Yoshio Inasawa, Chiyoda-ku (JP); Takuro Sasaki, Chiyoda-ku (JP); Yukihiro Honma, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 89 days.

(21) Appl. No.: 15/324,769

(22) PCT Filed: Apr. 16, 2015

(86) PCT No.: PCT/JP2015/061722
§ 371 (c)(1),
(2) Date: Jan. 9, 2017

(87) PCT Pub. No.: WO2016/017217
PCT Pub. Date: Feb. 4, 2016

(65) Prior Publication Data
US 2017/0209847 A1   Jul. 27, 2017

(30) Foreign Application Priority Data

Jul. 29, 2014   (JP) .................................. 2014-153942

(51) Int. Cl.
*B01J 19/12*   (2006.01)
*H05B 6/64*   (2006.01)
(Continued)

(52) U.S. Cl.
CPC ......... *B01J 19/126* (2013.01); *F27B 17/0016* (2013.01); *F27B 17/02* (2013.01);
(Continued)

(58) Field of Classification Search
None
See application file for complete search history.

(56) References Cited

U.S. PATENT DOCUMENTS

| | | |
|---|---|---|
| 5,262,743 A | 11/1993 | Jean |
| 2002/0134779 A1 | 9/2002 | Furtlehner et al. |

(Continued)

FOREIGN PATENT DOCUMENTS

| | | |
|---|---|---|
| EP | 0701862 A1 | 3/1996 |
| EP | 2385146 A1 | 11/2011 |

(Continued)

OTHER PUBLICATIONS

International Search Report dated Jul. 21, 2015, in PCT/JP2015/061722, filed Apr. 16, 2015.

(Continued)

*Primary Examiner* — Kishor Mayekar
(74) *Attorney, Agent, or Firm* — Oblon, McClelland, Maier & Neustadt, L.L.P.

(57) ABSTRACT

A microwave irradiating and heating device including: a reaction furnace containing a sample material to be irradiated with a microwave passed through an opening and to be heated; a microwave irradiating source disposed outside the reaction furnace; a rotated quadric surface mirror reflecting microwave emitted from the microwave irradiating source toward the opening, and disposed above the reaction furnace; a lid for the opening, at least a portion of the lid made from dielectric to transmit microwave reflected on the rotated quadric surface mirror into the reaction furnace; wherein an angle of incidence of the microwave, reflected on the rotated quadric surface mirror and irradiated at the portion of the lid made from the dielectric, is at an angle causing a polarized wave of the microwave to pass through the portion.

2 Claims, 7 Drawing Sheets

(51) Int. Cl.
*H05B 6/80* (2006.01)
*F27D 11/12* (2006.01)
*F27B 17/00* (2006.01)
*F27B 17/02* (2006.01)
*F27D 99/00* (2010.01)
*H05B 6/70* (2006.01)

(52) U.S. Cl.
CPC .......... *F27D 11/12* (2013.01); *F27D 99/0006* (2013.01); *H05B 6/64* (2013.01); *H05B 6/6402* (2013.01); *H05B 6/70* (2013.01); *H05B 6/80* (2013.01); *H05B 6/806* (2013.01); *B01J 2219/1215* (2013.01); *B01J 2219/1266* (2013.01); *B01J 2219/1293* (2013.01); *F27D 2099/0028* (2013.01)

(56) References Cited

U.S. PATENT DOCUMENTS

| | | |
|---|---|---|
| 2006/0110546 A1 | 5/2006 | Vikharev et al. |
| 2009/0026195 A1 | 1/2009 | Miyake et al. |
| 2010/0150534 A1 | 6/2010 | Kasai |
| 2013/0248522 A1* | 9/2013 | Hwang .................. H05B 6/64 219/756 |
| 2014/0017156 A1 | 1/2014 | Nagata et al. |
| 2015/0280495 A1 | 10/2015 | Homma et al. |

FOREIGN PATENT DOCUMENTS

| | | |
|---|---|---|
| JP | S47-024640 | 10/1972 |
| JP | S56-119265 | 9/1981 |
| JP | 4-297581 | 10/1992 |
| JP | H07-310887 | 11/1995 |
| JP | 2000-223260 A | 8/2000 |
| JP | 2002-113350 A | 4/2002 |
| JP | 2002-195541 A | 7/2002 |
| JP | 2003-100638 | 4/2003 |
| JP | 2004-504707 A | 2/2004 |
| JP | 2006-501122 A | 1/2006 |
| JP | 2006-89344 A | 4/2006 |
| JP | 2006-153845 A | 6/2006 |
| JP | 2006-260915 A | 9/2006 |
| JP | 2007-5347 A | 1/2007 |
| JP | 2007-113873 A | 5/2007 |
| JP | 2013-11384 A | 1/2013 |
| JP | 2014-15381 A | 1/2014 |
| WO | 94/26408 A1 | 11/1994 |
| WO | 2010/087464 A1 | 8/2010 |
| WO | 2014/054276 A1 | 4/2014 |
| WO | 2016/009691 A1 | 1/2016 |
| WO | 2016/017218 A1 | 2/2016 |

OTHER PUBLICATIONS

Sato et al, "Conceptual Design of microwave Applicators with Phased Array Antennas for Industries", The Fifth Symposium on Japan Society of Electromagnetic Wave Energy Applications, Proceedings 2B07, 2011, pp. 98-99.

Takikawa et al., "A Study of the Microwave Steel Manufacture System Applying Microwave Energy Transmission Technology", 2013 Institute of Electronics, Information and Communication Engineers General Conference, Proceedings B—Jan. 13, 2013, 1 page.

Decision to Grant a Patent dated May 31, 2016, issued in Japanese Patent Application No. 2015-553953 (with English translation).

Japanese Office Action dated Feb. 23, 2016, issued in Japanese Patent Application No. 2015-553953 (with English translation).

* cited by examiner

FIG.1
(a)
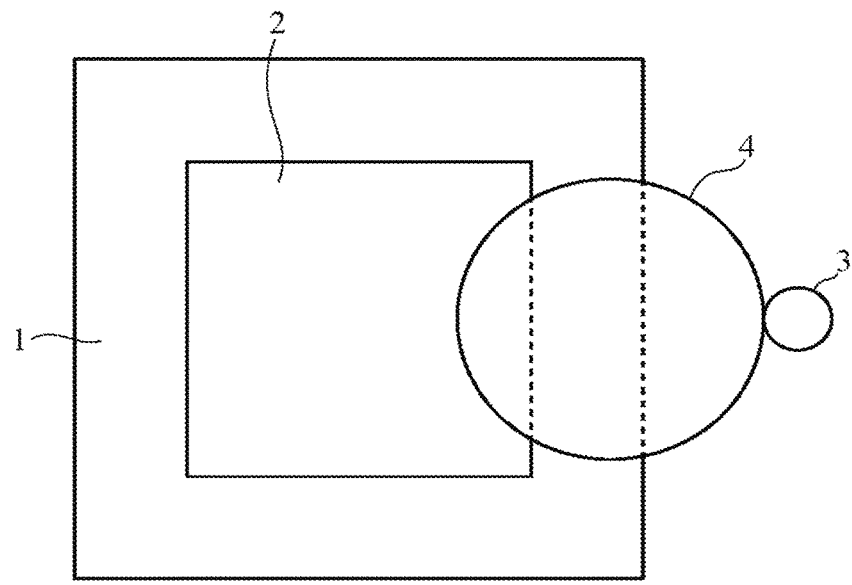
(b)
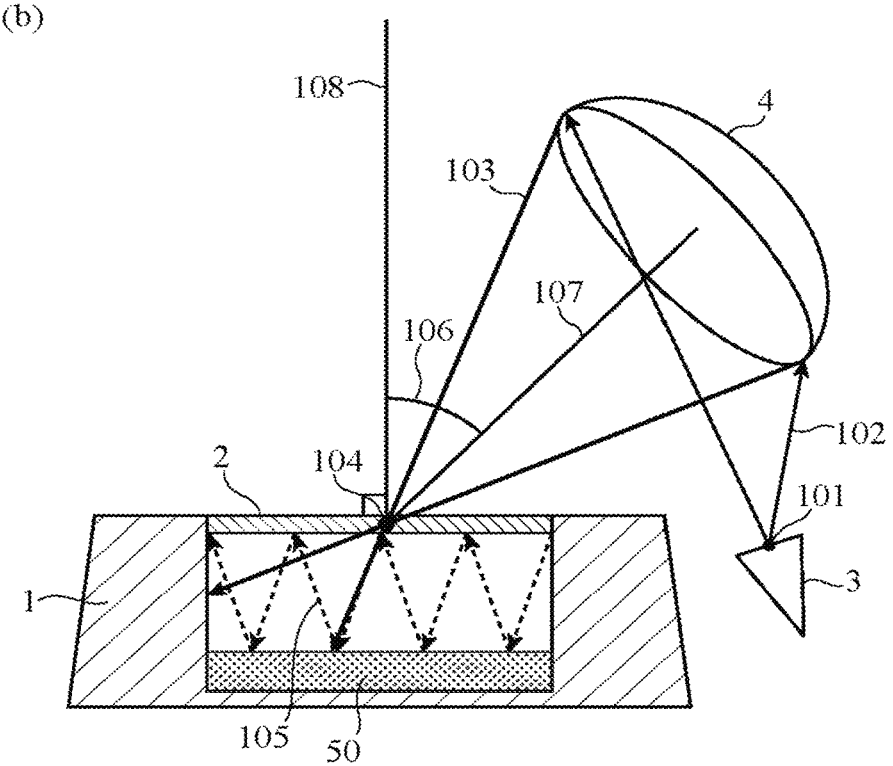

MICROWAVE IRRADIATING AND HEATING DEVICE

TECHNICAL FIELD

The present disclosure relates to a microwave irradiating and heating device for heating a sample material by irradiating the sample material with microwaves.

BACKGROUND ART

In the field of microwave transmission, various researches and developments have been conducted. For example, beam control techniques using an active phased array antenna (APAA) and efficient transmission techniques have been in research and development to put solar power satellites (SPS) into practice.

Further, efforts have been made to apply microwave transmission techniques to industrial applications. For example, patent literatures 1 and 2 disclose a steel manufacturing system that manufactures molten pig iron by irradiating a raw material with a microwave and heating this raw material. Further, non patent literatures 1 and 2 disclose techniques for using a phased array antenna as a microwave radiation source in a steel manufacturing system that uses the microwave. Furthermore, a technique for reducing the time required for chemical reaction by applying the microwave to chemical reaction has received attention recently.

At the present time, many applications of the microwave transmission techniques are those that are applied to small-scale devices. There is a demand for development of large-scale and large-electric-power devices, such as steel manufacturing systems.

CITATION LIST

Patent Literature

Patent Literature 1: WO No. 87464 entitled "Vertical Microwave Smelting Furnace."
Patent Literature 2: Japanese Unexamined Patent Application Publication No. 2013-11384 entitled "Microwave Oven."

Non Patent Literature

Non Patent Literature 1: Sato, Nagata, Shinohara, Mitani, hashimura, "Conceptual Design of microwave Applicators with Phased Array Antennas for Industries", The Fifth Symposium on Japan Society of Electromagnetic Wave Energy Applications, Proceedings 2B07 (2011).
Non Patent Literature 2: Takikawa, Homma, Sasaki, Inasawa, Nonishi, "A Study of the Microwave Steel Manufacture System Applying Microwave Energy Transmission Technology", 2013 Institute of Electronics, Information and Communication Engineers General Conference, Proceedings B-1-13 (2013).

SUMMARY OF INVENTION

Technical Problem

In the conventional microwave heating systems disclosed in patent literatures 1 and 2, and non patent literatures 1 and 2, microwave irradiating sources are arranged circumferentially around the reaction furnace. Thus, the microwave that is emitted from a microwave irradiating source (referred to as "first microwave irradiating source" from here on) to the sample material, which is an object to be heated, but that is not absorbed by the sample material reflects on the sample material and is irradiated on another microwave irradiating source (referred to as a "second microwave irradiating source" from here on) that is arranged facing the first microwave irradiating source with respect to the reaction furnace. Because of this reflection, there arises a problem that a failure occurs on the second microwave irradiating source. Further, because the state of sample material put into the reaction furnace may be various forms, such as solid, liquid, gas and powder, according to the product to be obtained, there is a problem that the sample material gets out of the reaction furnace when the reaction furnace is not equipped with a lid.

The present disclosure has been made in order to solve the above-mentioned problems, and it is therefore an object of the present disclosure to provide a microwave irradiating and heating device that can confine a microwave and a sample material within the reaction furnace.

Solution to Problem

A microwave irradiating and heating device according to the present disclosure includes: a reaction furnace having an opening and for containing a sample material to be irradiated with a microwave passed through the opening and to be heated; a microwave irradiating source for emitting the microwave, the microwave irradiating source being disposed outside the reaction furnace; a spheroidal mirror for reflecting the microwave emitted from the microwave irradiating source toward the opening of the reaction furnace, the spheroidal mirror being disposed above the reaction furnace; and a lid provided for the opening of the reaction furnace, at least a portion of the lid irradiated with the microwave reflected on the spheroidal mirror being made from dielectric to transmit the microwave into the reaction furnace; and a rugged portion for reflecting irregularly the microwave, the rugged portion being provided on a surface, among formed surfaces of the lid, facing the interior space of the reaction furnace in an area other than the portion to which the microwave is irradiated, wherein the microwave irradiating source and the spheroidal mirror are disposed so that an angle of incidence of the microwave, reflected on the spheroidal mirror and irradiated at the portion of the lid made from the dielectric, matches a Brewster angle of the dielectric.

Advantageous Effects of Invention

Because a microwave irradiating and heating device according to the present disclosure is configured as described above, the microwave irradiating and heating device can confine the microwave and the sample material within the reaction furnace.

BRIEF DESCRIPTION OF DRAWINGS

FIG. 1 is a diagram showing the configuration of a microwave irradiating and heating device according to Embodiment 1 of the present disclosure, and FIG. 1(a) is a top plan view and FIG. 1(b) is a sectional side view;

FIG. 2(a) is a top plan view and FIG. 2(b) is a sectional side view;

DESCRIPTION OF EMBODIMENTS

Figure 2:
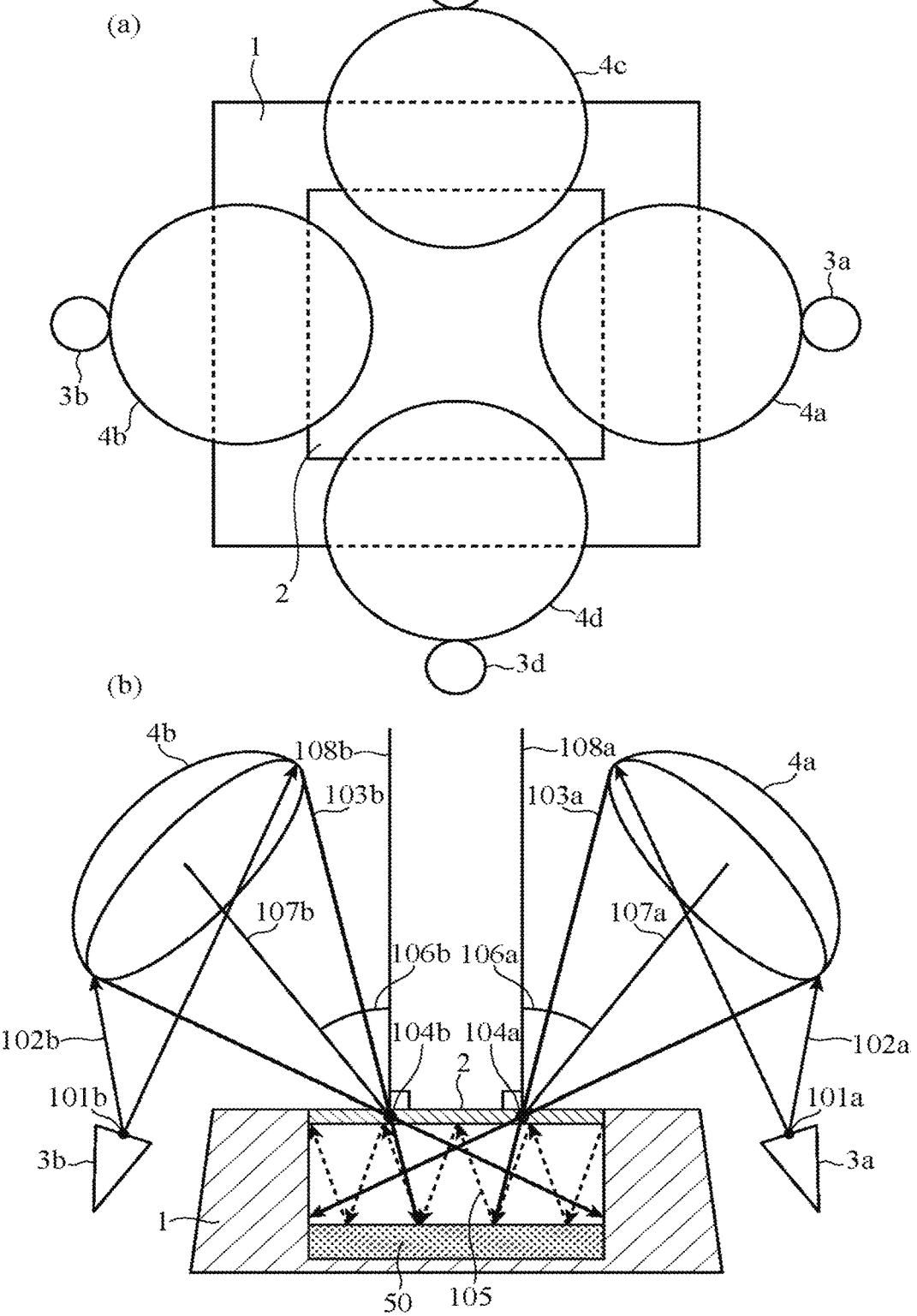
FIG. 2 is a diagram showing the configuration of a microwave irradiating and heating device according to Embodiment 2 of the present disclosure.

Hereafter, preferred embodiments of the present disclosure are explained in detail with reference to the drawings.

Embodiment 1

FIG. 1 is a diagram showing the configuration of a microwave irradiating and heating device according to Embodiment 1 of the present disclosure.

The microwave irradiating and heating device includes a reaction furnace 1, a dielectric plate (lid) 2, a microwave irradiating source 3 and a rotated quadric surface mirror 4, as shown in FIG. 1.

The reaction furnace 1 is a housing for containing a sample material 50 and for causing the sample material 50 to be irradiated with microwave and to be reacted and heated, and has an opening on an upper side thereof (on a side facing the rotated quadric surface mirror 4). The shape of the reaction furnace may be selected appropriately according to the form or characteristics of the sample material 50 to be reacted. The shape of the reaction furnace 1 which is illustrated as rectangle in FIG. 1 is not limited to the figure; the reaction furnace 1 may have any shapes, for example, circle.

The dielectric plate 2 is disposed at the opening of the reaction furnace 1. The material of the dielectric plate 2 may be selected appropriately as long as the selected material transmits microwaves, for example glass or the like. Although the shape of the dielectric plate 2 is illustrated as rectangle in FIG. 1, the shape of the dielectric plate 2 is not limited to this illustrated shape. The dielectric plate 2 may have any shapes, for example, circle.

The microwave irradiating source 3 is disposed outside the reaction furnace 1, and emits the microwave to cause the sample material 50 to be reacted. In Embodiment 1 shown in FIG. 1, a single microwave irradiating source is provided. Type of the microwave irradiating source 3, frequency of emitted microwave and the like may be selected appropriately. The microwave is emitted from the microwave irradiating source 3 in the direction of the rotated quadric surface mirror 4.

The rotated quadric surface mirror 4 is disposed above the reaction furnace 1, and reflects the microwave emitted from the microwave irradiating source 3 into the reaction furnace 1 through the dielectric plate 2. As shown by the incident wave 102, the microwave emitted from the microwave irradiating source 3 (a first focal point 101) is made incident upon the rotated quadric surface mirror 4. After that, the microwave reflected by the rotated quadric surface mirror 4 is converged at the dielectric plate 2 (a second focal point 104), as shown by the incident wave 103. Thus, the rotated quadric surface mirror 4 has the first and second focal points 101, 104 at the positions of the microwave irradiating source 3 and the dielectric plate 2, respectively. Note that FIG. 1 shows the rotated quadric surface mirror as spheroidal mirror.

The materials of the reaction furnace 1 and the rotated quadric surface mirror 4 may be selected appropriately.

When a microwave is made incident upon a boundary plane between substances having different indexes of refraction, part of the microwave is reflected on the boundary plane while the remaining part passes through the boundary plane. However, there exists an angle of incidence at which all the microwave passes through the boundary plane, without reflection, only when the microwave being incident upon the boundary plane is such a microwave that has electric field component parallel to the incidence plane (a plane perpendicular to the boundary plane), called TM wave. This angle of incidence is called Brewster angle, and is dependent on the electrical property of the dielectric.

Accordingly, in the present disclosure, the microwave irradiating source 1 and the rotated quadric surface mirror 4 are arranged in such a way that the angle of incidence of the microwave incident upon the dielectric plate 2 (i.e., the angle which is formed by the center line 107 of the solid angle within which the whole of the rotated quadric surface mirror 4 is viewed from the second focal point 104 and the normal line 108 of the dielectric plate 2) matches a Brewster angle 106 of the dielectric plate 2. However, even if the angle of incidence of the microwave incident upon the dielectric plate 2 does not strictly match the Brewster angle 106 of the dielectric plate 2, most of the microwave passes through the dielectric plate 2 as long as the values of the two angles are close to each other Therefore, the above-mentioned two angles do not necessarily have to match each other (the angle of incidence of the above-mentioned microwave may take any values at which a specific polarized wave of the microwave passes through the dielectric plate 2).

Although the whole of the opening of the reaction furnace 1 is covered with the dielectric plate 2 in FIG. 1, the disclosure is not limited to this illustrated embodiment. It is not required that the whole of the member covering the opening of the reaction furnace 1 be the dielectric plate 2. More specifically, a lid may be used configured in such a manner that only a portion of the lid to transmit microwaves, for example a portion shaped like a hole, is made from dielectric (such as glass) that transmits microwaves, and that the remaining portion is made from materials that reflect microwaves without transmitting them.

Next, the operation of the microwave irradiating and heating device configured as above is explained.

A microwave emitted by the microwave irradiating source 3 is made incident on the dielectric plate 2 via the rotated quadric surface mirror 4. In the present disclosure, because the angle of incidence of the microwave incident upon the dielectric plate 2 matches Brewster angle 106 of the dielectric plate 2, the incident wave 103 proceeding toward the sample material 50 all passes through the dielectric plate 2 without being reflected, and further proceeds toward the sample material 50 contained in the reaction furnace 1. Part of the microwave irradiated on the sample material 50 is reacted with the sample material 50 and absorbed as heat by the sample material 50. The remaining microwave which is not absorbed is reflected as a reflected wave 105 in the direction opposite to the incident direction on to the sample material 50. At this time, the direction of the electric field component of the microwave rotates, and the reflection direction disperses, according to the way of arrangement and the scattering characteristics of the sample material 50. In the present disclosure, because the dielectric plate 2 is disposed on the reaction furnace 1, the microwave is reflected on this dielectric plate 2 and again is irradiated on the sample material 50. As a result, the sample material 50 can be heated efficiently.

Even if portion of the microwave leaks out from the hole 21 of the lid 2, the amount of such leakage is very small compared with the propagation loss in the device. Therefore, such leakage does not cause the breakdown of the microwave irradiating source 3. In addition, because the reaction furnace 1 is sealed physically with the dielectric plate 2, there is no need to worry that the sample material 50 might get out of the reaction furnace 1.

As described above, in the microwave irradiating and heating device according to Embodiment 1, the rotated quadric surface mirror 4 is used, at least a portion of the lid irradiated with the microwave reflected on the rotated quadric surface mirror is made from dielectric, the lid (the dielectric plate 2) that transmits the microwave into the inner space of the reaction furnace 1 is provided for the opening of the reaction furnace 1, and the microwave irradiating source 3 and the rotated quadric surface mirror 4 are disposed so that an angle of incidence of the microwave, reflected on the rotated quadric surface mirror and irradiated at the portion of the lid made from the dielectric, becomes an angle to cause a polarized wave of the microwave to pass through the portion. Thus, the microwave irradiating and heating device can confine the microwave and the sample material 50 within the reaction furnace 1. As a result, failures can be prevented from occurring in the microwave irradiating source 3, and the sample material 50 can be prevented from getting out of the reaction furnace 1. In addition, because the microwave irradiating and heating device can confine the microwave within the reaction furnace 1, the microwave reflected on the sample material 50 can be used effectively within the reaction furnace 1, that is, be irradiated again on the sample material 50. Therefore there is provided an advantageous effect of improving the efficiency of energy.

Embodiment 2

FIG. 2 is a diagram showing the configuration of a microwave irradiating and heating device according to Embodiment 2 of the present disclosure. The microwave irradiating and heating device according to Embodiment 2 shown in FIG. 2 is composed of four systems each including the microwave irradiating source 3 and the rotated quadric surface mirror 4, provided for the microwave irradiating and heating device according to Embodiment 1 as shown in FIG. 1. In order to distinguish between the systems in the diagram, suffix symbol (a to d) are attached to the reference numerals denoting the components of the systems, respectively. Because the other components are the same as those according to Embodiment 1, explanation of the other components is omitted by denoting them with the same reference numerals.

In this embodiment, the microwave irradiating sources 1 and the rotated quadric surface mirrors 4 are arranged in such a way that each first focal point 101 is placed at the position of the microwave irradiating source 3 for each system, that each second focal point 104 is placed at a position on the dielectric plate 2, and that each angle of incidence of each microwave incident upon the dielectric plate 2 matches the Brewster angle 106 of the dielectric plate 2. However, even if the angle of incidence of the microwave incident upon the dielectric plate 2 does not strictly match the Brewster angle 106 of the dielectric plate 2, most of the microwave passes through the dielectric plate long as the values of the two angles are close to each other. Therefore, the above-mentioned two angles do not necessarily have to match each other (the angle of incidence of the above-mentioned microwave may take any values at which a specific polarized wave of the microwave passes through the dielectric plate 2).

Although the embodiment shown in FIG. 2 is composed of four systems each including the microwave irradiating source 3 and the rotated quadric surface mirror 4, the number of the systems is not limited to four. There may be provided two or more systems.

Although the embodiment shown in FIG. 2 includes the second focal points 104 at different positions for incident waves 103 directed toward the sample material 50, this arrangement does not limit the location of the focal points. For example, these second focal points 104 may be placed at a common point.

As described above, according to the Embodiment 2, which is composed of a plurality of systems each including the microwave irradiating source 3 and the rotated quadric surface mirror 4, advantageous effects similar to those provided by Embodiment 1 are provided.

Embodiment 3

Figure 3:
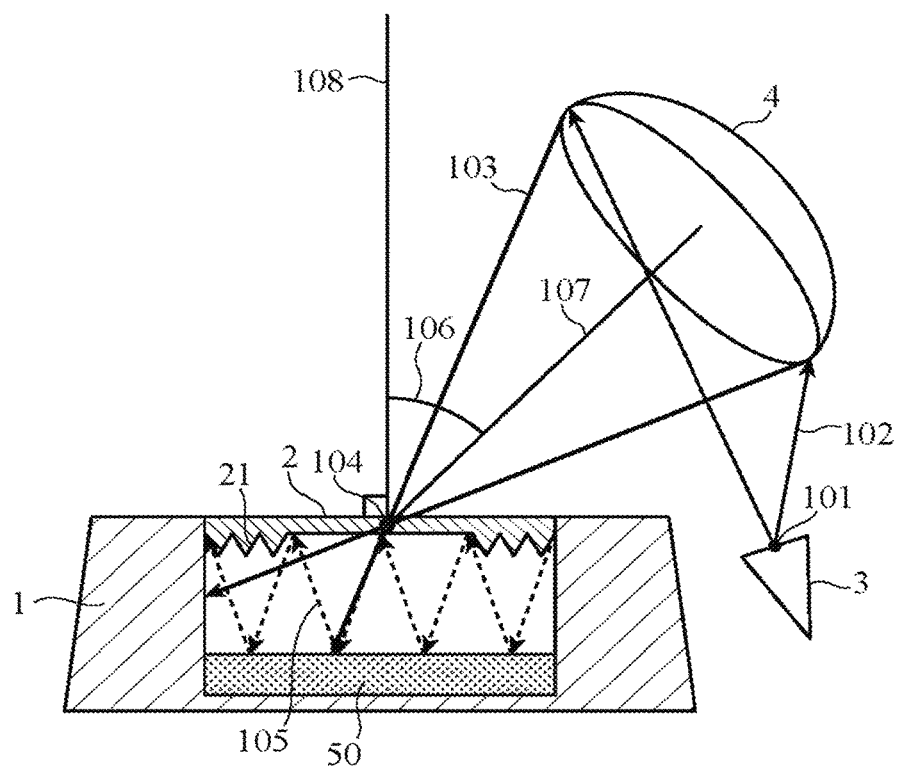
FIG. 3 is a sectional side view showing the configuration of a microwave irradiating and heating device according to Embodiment 3 of the present disclosure.

FIG. 3 is a diagram showing the configuration of a microwave irradiating and heating device according to Embodiment 3 of the present disclosure.

In the microwave irradiating and heating device according to Embodiment 3 shown in FIG. 3, a rugged portion 21 is provided on the back surface among the formed surfaces of the lid (i.e., the surface facing the interior space of the reaction furnace 1) of the microwave irradiating and heating device according to Embodiment 1 shown in FIG. 1. Because the other components are the same as those according to Embodiment 1, explanation of the other components is omitted by denoting them with the same reference numerals.

The rugged portion 21 is provided on the back surface among the formed surfaces of the lid except for the portion to which the microwave is irradiated. The rugged portion 21 reflects irregularly the microwave reflected within the reaction furnace 1. More specifically, the rugged portion 21 is formed on the outer area of the center area of the back surface of the dielectric plate 2 in a case in which the dielectric plate 2 is provided to cover the whole of the opening of the reaction furnace 1 and the center of the dielectric plate is irradiated with the microwave, as shown in FIG. 3. In a case in which a lid having a portion made from dielectric and the other portion made from materials other than the dielectric plate 2 is used to cover the opening of the reaction furnace 1, it is preferable to form the rugged portion 21 on the other portion made from materials other than dielectric. The material, shape, or type of the rugged portion 21 may be selected appropriately. By forming the rugged portion 21, the reflected microwave 105 from the sample material 50 is made to reflect more complicatedly and more times within the reaction furnace 1 than the configuration according to Embodiment 1 shown in FIG. 1, thereby providing an advantageous effect of reducing the microwave leakage from the dielectric plate 2.

By providing the rugged portion 21 on the back surface among the formed surfaces of the lid except for the portion to which the microwave from the rotated quadric surface mirror 4 is irradiated, as described above, there are provided advantageous effects of heating the sample material 50 more efficiently and of reducing the leakage of the microwave from the dielectric plate 2 according to Embodiment 3, in addition to those provided according to Embodiment 1.

In the above description the case in which the rugged portion 21 is applied to the configuration according to Embodiment 1 shown in FIG. 1 is shown. The rugged portion 21 may be applied similarly to the configuration according to Embodiment 2 shown in FIG. 2, which provides the same or similar advantageous effects.

Embodiment 4

Figure 4:
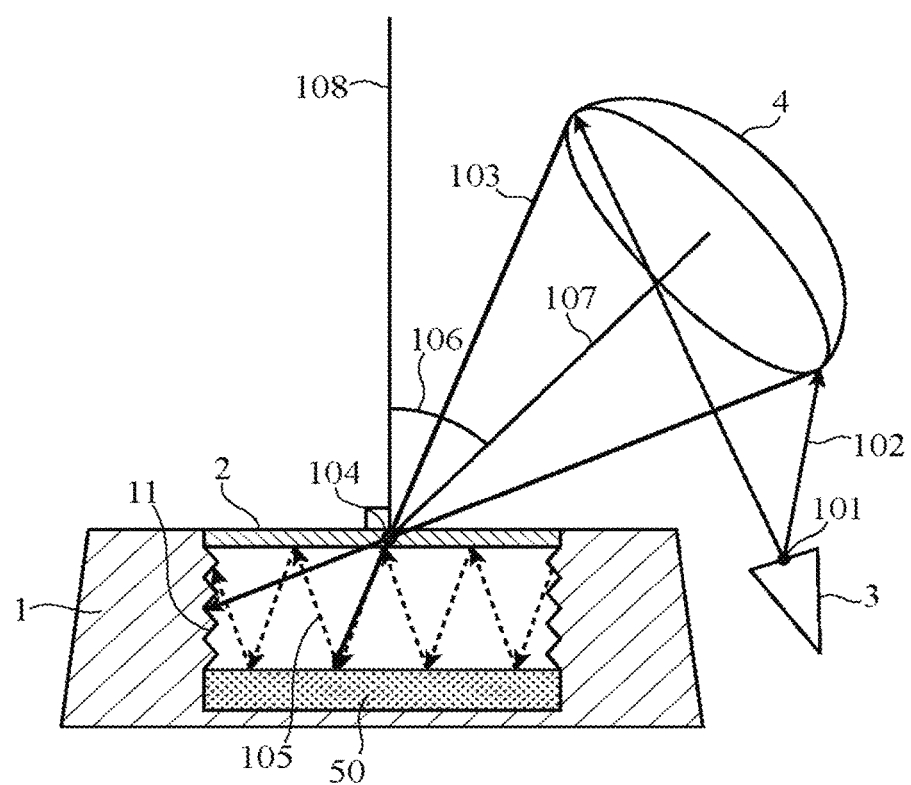
FIG. 4 is a sectional side view showing the configuration of a microwave irradiating and heating device according to Embodiment 4 of the present disclosure.

FIG. 4 is a diagram showing the configuration of a microwave irradiating and heating device according to Embodiment 4 of the present disclosure.

In the microwave irradiating and heating device according to Embodiment 4 shown in FIG. 4, a rugged portion 11 is provided on the inner side walls of the reaction furnace 1 of the microwave irradiating and heating device according to the Embodiment 1 shown in FIG. 1. Because the other components are the same as those according to Embodiment 1, explanation of the other components is omitted by denoting them with the same reference numerals.

The rugged portion 11 is provided on the inner side walls of the reaction furnace 1, and reflects irregularly the microwave reflected within the reaction furnace 1. The material, shape, or type of the rugged portion 11 may be selected appropriately. By forming the rugged portion 11, the microwave 105 reflected on the sample material 50 reflects more complicatedly and more times within the reaction furnace 1 than the configuration according to Embodiment 1 shown in FIG. 1. As a result of this, there is provided an advantageous effect that the amount of the microwave leakage from the dielectric plate 2 is reduced.

By providing the rugged portion 11 on the inner side walls of the reaction furnace 1, as described above, there are provided advantageous effects of heating the sample material 50 more efficiently and of reducing the leakage of the microwave from the dielectric plate 2 according to Embodiment 4, in addition to those provided according to Embodiment 1.

In the above description the case in which the rugged portion 11 is applied to the configuration according to Embodiment 1 shown in FIG. 1 is shown. The rugged portion 11 may be applied similarly to the configuration according to Embodiment 2 shown in FIG. 2, which provides the same or similar advantageous effect.

Embodiment 5

Figure 5:
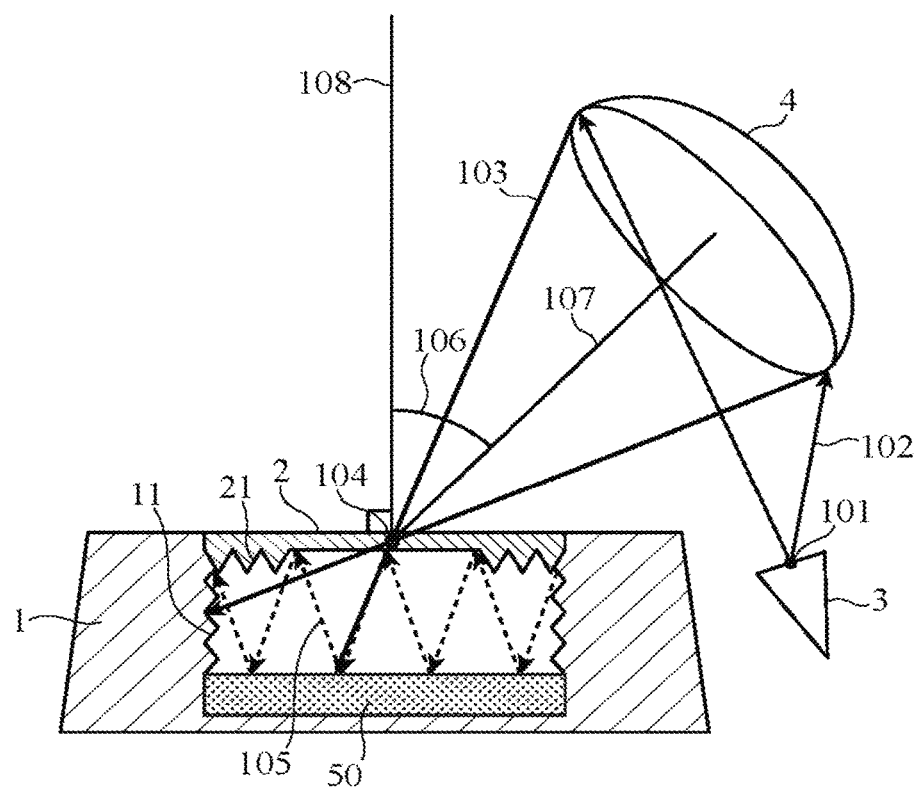
FIG. 5 is a sectional side view showing the configuration of a microwave irradiating and heating device according to Embodiment 5 of the present disclosure.

FIG. 5 is a diagram showing the configuration of a microwave irradiating and heating device according to Embodiment 5 of the present disclosure.

In the microwave irradiating and heating device according to Embodiment 5 shown in FIG. 5, a rugged portion 21 is provided on the back surface among the formed surfaces of the lid (i.e., the surface facing the interior space of the reaction furnace 1) of the microwave irradiating and heating device according to Embodiment 1 shown in FIG. 1, and also a rugged portion 11 is provided on the inner side walls of the reaction furnace 1 of the microwave irradiating and heating device according to Embodiment 1 shown in FIG. 1. Because the other components are the same as those according to Embodiment 1, explanation of the other components is omitted by denoting them with the same reference numerals.

The rugged portion 21 is provided on the back surface among the formed surfaces of the lid except for the portion to which the microwave is irradiated. The rugged portion 21 reflects irregularly the microwave reflected within the reaction furnace 1. The rugged portion 11 is provided on the inner side walls of the reaction furnace 1, and reflects irregularly the microwave reflected within the reaction furnace 1. The material, shape, or type of the rugged portions 11, 21 may be selected appropriately. By forming the rugged portions 11, 21 the microwave 105 reflected on the sample material 50 reflects more complicatedly and more times within the reaction furnace 1 than the configuration according to Embodiment 1 shown in FIG. 1. As a result of this, there is provided an advantageous effect that the amount of the microwave leakage from the dielectric plate 2 is reduced.

By providing the rugged portion 21 the back surface among the formed surfaces of the dielectric plate 2 except for the portion to which the microwave from the rotated quadric surface mirror 4 is irradiated, and also by providing the rugged portion 11 on the inner side walls of the reaction furnace 1, as described above, there are provided advantageous effects of heating the sample material 50 more efficiently and of reducing the leakage of the microwave from the dielectric plate 2 according to Embodiment 5, in addition to those provided according to Embodiment 1.

In the above description the case in which the rugged portions 11, 21 are applied to the configuration according to Embodiment 1 shown in FIG. 1 is shown. The rugged portions 11, 21 may be applied similarly to the configuration according to Embodiment 2 shown in FIG. 2, which provides the same or similar advantageous effects.

Further, in Embodiments 3 to 5, the rugged portions 11, 21 may have, for example, the form of a plane on which triangular prisms are arranged, or a plane on which triangular pyramids, pyramids or semi-spheres are arranged. That is, the rugged portion may have any shapes that provide the advantageous effect of reflecting and diffusing the microwave.

Embodiment 6

Figure 6:
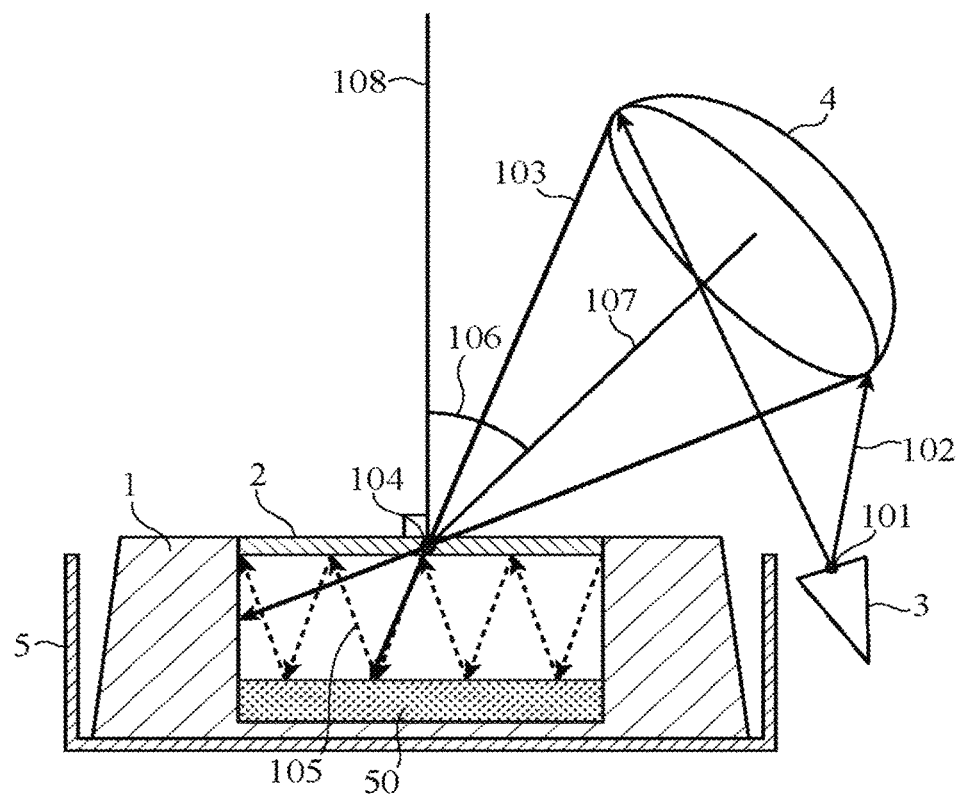
FIG. 6 is a sectional side view showing the configuration of a microwave irradiating and heating device according to Embodiment 6 of the present disclosure.

FIG. 6 is a diagram showing the configuration of a microwave irradiating and heating device according to Embodiment 6 of the present disclosure.

In the microwave irradiating and heating device according to Embodiment 6 shown in FIG. 6, a heater 5 is provided to the microwave irradiating and heating device according to Embodiment 1 shown in FIG. 1. Because the other components are the same as those according to Embodiment 1, explanation of the other components is omitted by denoting them with the same reference numerals.

The heater 5 is arranged outside the reaction furnace 1, and is used to heat the reaction furnace 1. A method of heating or type of the heater 5 may be selected appropriately. In addition to heating the sample material 50 with the microwave, heating the reaction furnace 1 with the heater 6 increases the temperature within the reaction furnace 1. As a result of this, the reaction rate of the sample material 50 is improved.

As described above, because the microwave irradiating and heating device according to this Embodiment 6 includes the heater 5 for heating the reaction furnace 1, an advantageous effect of heating the sample material 50 more efficiently is obtained, in addition to the advantageous effects provided by Embodiment 1.

In the above description the case in which the heater 5 is applied to the configuration according to Embodiment 1 shown in FIG. 1 is shown. The heater may be applied similarly to the configuration according to any of Embodiments 2 to 5 shown in FIGS. 2 to 5, which provides the same or similar advantageous effect.

Embodiment 7

Figure 7:
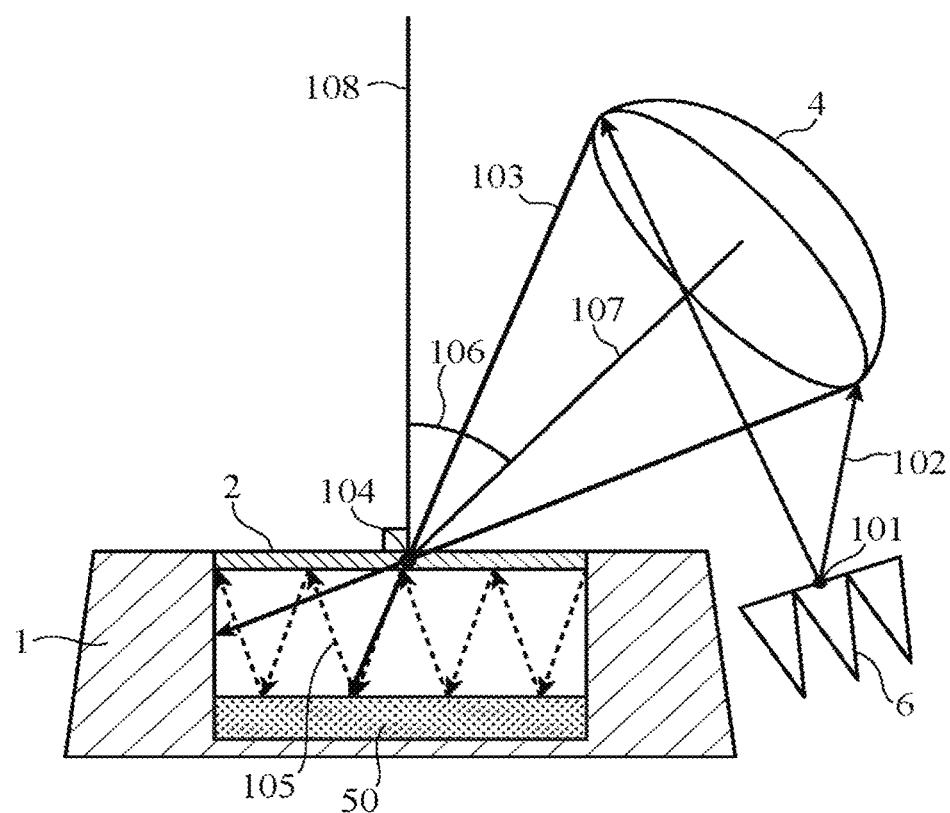
FIG. 7 is a sectional side view showing the configuration of a microwave irradiating and heating device according to Embodiment 7 of the present disclosure.

FIG. 7 is a diagram showing the configuration of a microwave irradiating and heating device according to Embodiment 7 of the present disclosure.

In the microwave irradiating and heating device according to Embodiment 7 shown in FIG. 7, the microwave irradiating source 3 of the microwave irradiating and heating device according to Embodiment 1 shown in FIG. 1 is embodied as an active phased array antenna 6. Because the other components are the same as those according to Embodiment 1, explanation of the other components is omitted by denoting them with the same reference numerals.

The active phased array antenna 6 includes amplifiers and phase shifters, each set of an amplifier and a phase shifter is provided for each antenna element or sub-array antenna having antenna elements. By optimizing an amplification amount of each amplifier and a phase amount of each phase shifter, the irradiation distribution of the microwave irradiated on the sample material 50 can be controlled flexibly. Amplification amounts and phase amounts may be adjusted appropriately to attain a target irradiation distribution.

As described above, because in the microwave irradiating and heating device according to Embodiment 7 the active phased array antenna 6 that can adjust freely the amplitude and the phase of the emitted microwave is used as the microwave irradiating source 3, there is provided an advantageous effect of being able to control flexibly the microwave irradiation distribution to the sample material 50, in addition to the advantageous effects provided by Embodiment 1.

In the above description the case in which the active phased array antenna 6 is applied to the configuration according to Embodiment 1 shown in FIG. 1 is shown. The active phased array antenna may be applied similarly to the configuration according to any of Embodiments 2 to 6 shown in FIGS. 2 to 6, which provides the same or similar advantageous effects.

Further, in Embodiments 1 to 7, it is not necessary to set strictly the position of the second focal point 104 to the position of the dielectric plate 2; the position of the second focal point 104 may be placed over or under the position of the dielectric plate 2 as long as microwaves irradiated on the dielectric plate 2 can pass through the dielectric plate 2.

While the disclosure has been described in its preferred embodiments, it is to be understood that combination, modification or omission of parts of embodiments described above may be made within the scope of the disclosure.

INDUSTRIAL APPLICABILITY

Because a microwave irradiating and heating device according to the present disclosure includes a reaction furnace for heating a sample material contained in the reaction furnace and irradiated with a microwave passed through an opening of the reaction furnace, a microwave irradiating source disposed outside the reaction furnace for emitting the microwave, rotated quadric surface mirror disposed above the reaction furnace, and a lid provided for the opening of the reaction furnace, a portion of the lid irradiated with the microwave reflected on the rotated quadric surface mirror being made from dielectric to transmit the microwave reflected on the rotated quadric surface mirror into the reaction furnace, wherein the microwave irradiating source and the rotated quadric surface mirror are disposed so that an angle of incidence of the microwave at the portion to which the microwave is irradiated becomes an angle to cause a polarized wave of the microwave reflected on the rotated quadric surface mirror to pass through the portion. Therefore, the microwave irradiating and heating device can confine the microwave and the sample material within the reaction furnace and is suitable for heating sample materials.

REFERENCE SIGNS LIST

1 reaction furnace, 2 dielectric plate, 3 microwave irradiating source, 4, 4a to 4d rotated quadric surface mirror, 5 heater, 6 active phased array antenna, 11 rugged portion, 21 rugged portion, 50 sample material, 101, 101a, 101b first focal point, 102, 102a, 102b incident wave, 103, 103a, 103b incident wave, 104, 104a, 104b second focal point, 105 reflected wave, 106, 106a, 106b Brewster angle, 107, 107a, 107b center line, and 108, 106a, 108b normal line.

The invention claimed is:

1. A microwave irradiating and heating device comprising:
   a reaction furnace having an opening and for containing a sample material to be irradiated with a microwave passed through the opening and to be heated;
   a microwave irradiating source for emitting the microwave, the microwave irradiating source being disposed outside the reaction furnace;
   a spheroidal mirror for reflecting the microwave emitted from the microwave irradiating source toward the opening of the reaction furnace, the spheroidal mirror being disposed above the reaction furnace;
   a lid provided for the opening of the reaction furnace, at least a portion of the lid to which the microwave is irradiated being made from dielectric to transmit the microwave reflected on the spheroidal mirror into the reaction furnace; and
   a rugged portion for reflecting irregularly the microwave reflected within the reaction furnace, the rugged portion being provided on a surface, among formed surfaces of the lid, facing the interior space of the reaction furnace in an area other than the portion to which the microwave is irradiated, wherein
   the microwave irradiating source and the spheroidal mirror are disposed so that an angle of incidence of the reflected microwave, reflected on the spheroidal mirror and irradiated at the portion of the lid made from the dielectric, matches a Brewster angle of the dielectric.

2. The microwave irradiating and heating device according to claim 1, wherein the microwave irradiating source is an array antenna.

* * * * *